United States Patent [19]

Lievonen

[11] 4,355,919
[45] Oct. 26, 1982

[54] PIPE CONNECTION

[76] Inventor: Kari J. Lievonen, 1110 Sixth Ave. South, Lake Worth, Fla. 33460

[21] Appl. No.: 193,339

[22] Filed: Oct. 1, 1980

[51] Int. Cl.³ .......................... F16B 7/08; F16L 41/00
[52] U.S. Cl. .................................. 403/191; 403/178; 403/234; 403/255; 403/264
[58] Field of Search ............... 403/171, 172, 174, 176, 403/177, 189, 191, 234, 237, 263, 264, 255, 230, 356; 256/65, 66, 67

[56] References Cited

U.S. PATENT DOCUMENTS

| 2,941,855 | 6/1960 | Weill | 403/237 |
| 3,233,871 | 2/1966 | Schroer | 403/191 X |
| 3,867,048 | 2/1975 | Endzweig | 403/264 X |

FOREIGN PATENT DOCUMENTS

| 30341 | 9/1931 | Australia | 403/234 |
| 1564531 | 3/1969 | France | 403/255 |

*Primary Examiner*—Wayne L. Shedd

*Attorney, Agent, or Firm*—Jack N. McCarthy

[57] ABSTRACT

A pipe connection, and method for forming said connection, wherein one pipe is connected at an angle to the side of a second pipe, said connection forming a structural joint and not a flow passage; a first pipe has a cylindrical opening formed in its side while a second pipe has one end contoured to fit against the side of said first pipe over said opening; said second pipe has a locking member fixed to the interior thereof with a projection which fits into the opening in said first pipe with said projection having a stem extending therefrom having an enlarged head which projects into the interior of said first pipe; a holding clip is positioned between the underside of said enlarged head and the inner surface of said first pipe forcing the contoured end of said second pipe against the side of said first pipe. When the pipe material used is PVC, ABS, or any other plastic with similar characteristics of resiliency and bond-ability, the diametrical contour at the end of said second pipe is formed having a diameter which is slightly smaller than that of the first pipe.

11 Claims, 9 Drawing Figures

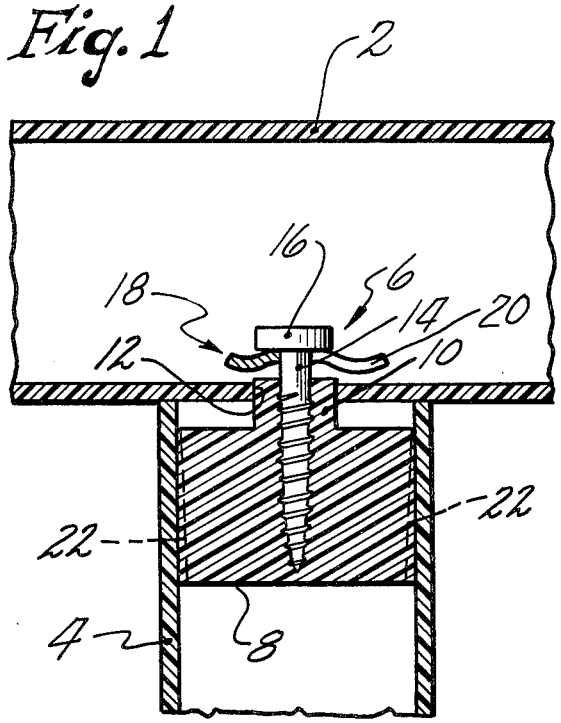
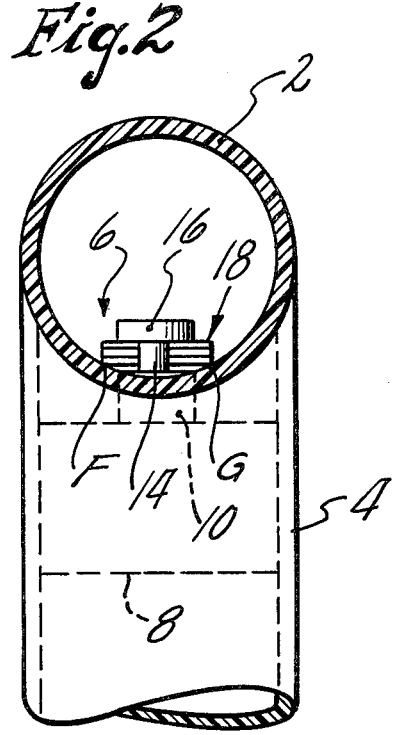
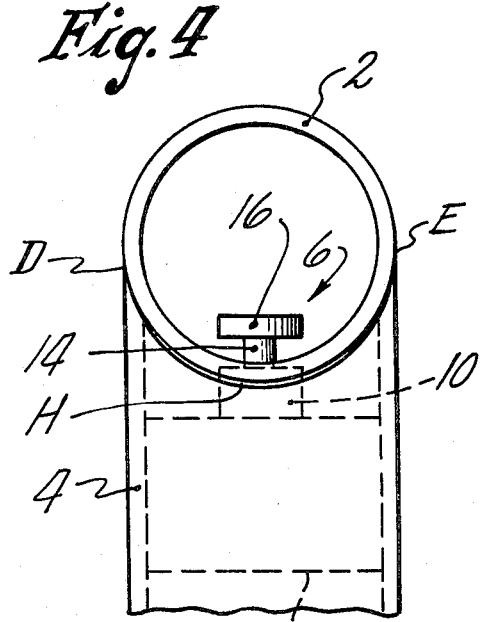
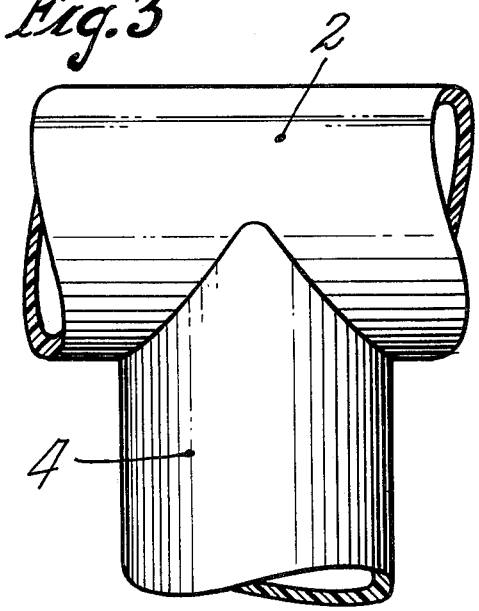
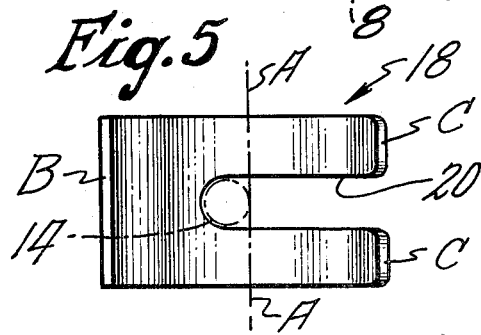
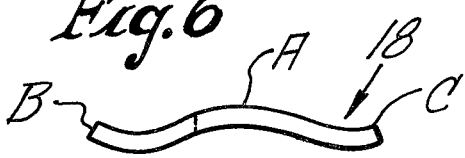

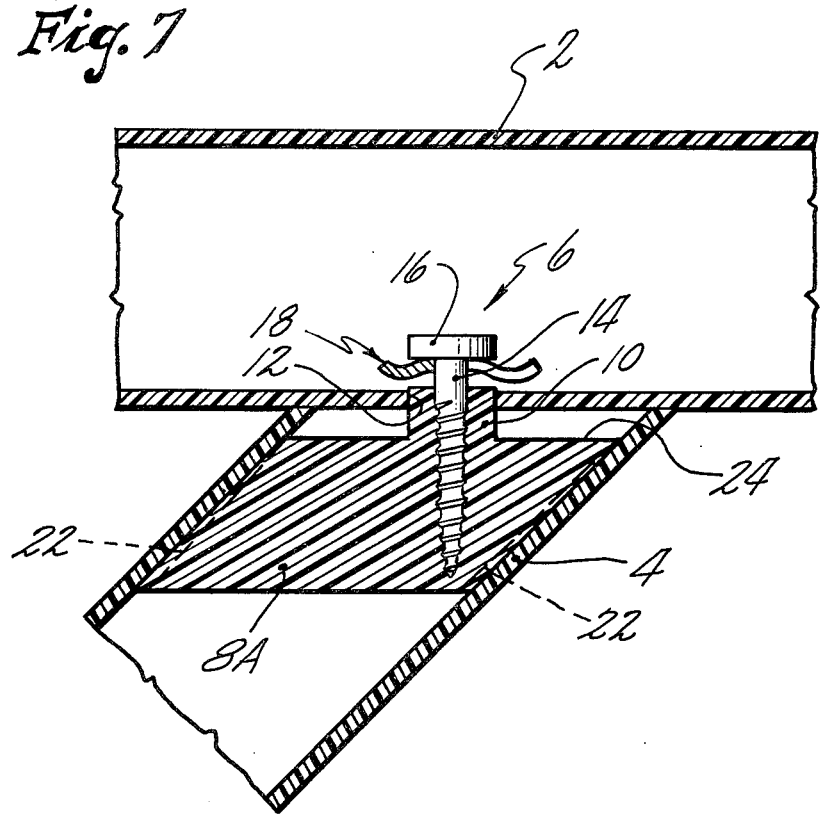
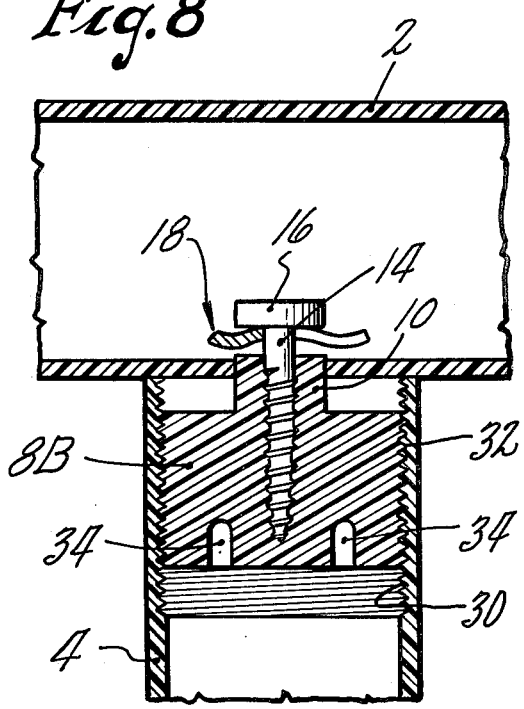
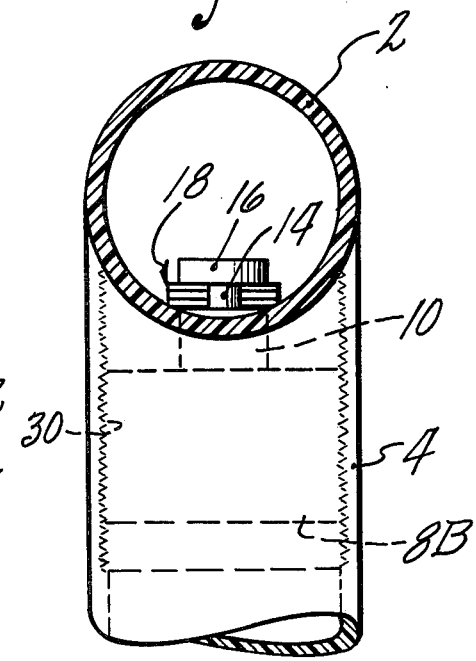

PIPE CONNECTION

BACKGROUND OF THE INVENTION

This invention relates to a new and improved pipe, or tubular member, connection wherein a first tubular member is connected at an angle to a second tubular member, said connection connecting the tubular members as structural members and not connecting them for flow therethrough. This pipe connection relates more particularly to the connection of tubular members for the formation of furniture, such as chairs. Many complicated arrangements have been shown in the past involving screw members or pins extending through one tubular member into a nut or plate within the second tubular member, and some of these arrangements were not easily removable after the tubular members had been connected. A group of prior art patents showing tubular members, or pipes, connected together follow: U.S. Pat. No. 1,972,997; U.S. Pat. No. 3,674,293; U.S. Pat. No. 3,850,534; Swiss Pat. No. 172311; and British Pat. No. 1232489.

SUMMARY OF THE INVENTION

A primary object of the present invention is to provide an internal, invisible and removable connection between two pipes wherein the end of one pipe is connected to the exterior of a second pipe.

Another object of this invention is to provide a method of connecting one end of a cylindrical pipe to the outer side of another cylindrical pipe wherein one pipe has an opening formed in the side thereof and a second pipe has one end contoured to fit against the side of said first pipe. A cylindrical locking plug is formed for fixing into the interior of said second pipe adjacent its contoured end and having a small projection which will fit into the opening in said first pipe and have an enlarged head which will extend into the interior of said first pipe, after said cylindrical locking plus has been fixed into the contoured end of said second pipe with the contoured end of said second pipe then placed over the opening through the side of the first pipe with the small projection fitting into said opening and the enlarged head positioned within said first pipe, a biasing force is applied between the enlarged head and inner wall of said second pipe to force said contoured end of said second pipe against the outer side of said first pipe.

A further object of the invention is to provide a means for connecting one end of a cylindrical pipe to the outer side of another cylindrical pipe; a first pipe is provided with an opening in the side thereof and a second pipe has one end having a locking plug fixed therein, such as by bonding, having a projection which extends from the end of the pipe, said locking plug further has an enlarged head spaced from the end of the projection; when connected the projection fits into the opening in the first pipe while the head is positioned within said pipe; a holding clip formed as a leaf spring is located between the enlarged head and the inner wall of said first pipe to force the end of said second pipe against the side of said first pipe.

Another object of this invention is to provide a means for connecting one end of a first cylindrical pipe to the outer side of a second cylindrical pipe wherein said cylindrical pipes are formed of PVC, ABS, or any other plastic having similar characteristics of resiliency and bondability, where the contoured end of the first pipe, which is contoured to fit over the outer side of the other pipe, is formed having a diameter which is of a slightly smaller diameter than that of the outer side of the second pipe.

A further object of this invention is to provide a locking plug which can be bonded to the interior of a cylindrical pipe, said plug having grooves along the length of its outer periphery to permit a PVC, ABS or any other plastic cement to extend for the length of the locking plug when it is pushed into its cooperating pipe; these grooves permit the cement to have a liberal application for the length of the plug at a multiplicity of locations around the circumference of the locking plug.

Another object of this invention is to provide a locking plug which can be threaded into the interior of an internally threaded cylindrical pipe, said plug having means on each end thereof for threading said plug into or out of said pipe; said action permitting adjusting of the distance that the enlarged head is positioned into the pipe to provide for holding clips of varying sizes.

A further object of the invention is to provide a locking plug wherein a cylindrical plug and projecting stem is formed around a metal centerpiece having a head extending a spaced distance from the end of the stem.

Another object of this invention is to provide a metal holding clip which is formed in a wavy manner with its ends curved upwardly to provide for easy insertion and removal by permitting the holding clip to slide along the inner circumference of the pipe.

BRIEF DESCRIPTION OF THE DRAWINGS

FIG. 1 is a side view in section showing two pipes connected to each other at 90° by a locking means;

FIG. 2 is a view taken from the right of FIG. 1 showing the locking means extending into the pipe;

FIG. 3 is an external side view showing two pipes connected;

FIG. 4 is a view similar to FIG. 2, taken just before the two pipes are forced together forming the smooth pipe connection shown in FIG. 3;

FIG. 5 is a top view of the holding clip;

FIG. 6 is a side view of the holding clip of FIG. 5;

FIG. 7 is a side view of a section showing two pipes connected to each other at approximately 45° by a locking means;

FIG. 8 is a side view in section showing two pipes connected to each other at 90° by a locking means having a threaded locking plug which cooperates with an internally threaded end of one pipe; and FIG. 9 is a view taken from the right of FIG. 8 showing the locking means extending into the pipe and the threaded connection of the locking plug and pipe.

DESCRIPTION OF THE PREFERRED EMBODIMENT

As seen in FIG. 1, pipe, or tubular member, 2, is shown having a pipe, or tubular member, 4, extending from the side thereof with said pipes 2 and 4 being held together by locking means 6. The cooperating end of pipe 4 is formed having a diametrical contour which permits that end of pipe 4 to fit against the side of pipe 2. The contoured end of pipe 4 has a cylindrical locking plug 8 fixed to the interior thereof, said locking plug 8 having a smaller cylindrical projection 10 extending therefrom in the direction of the contoured end. At the location along pipe 2 where it is desired to have pipe 4 attached, a circular opening 12 is placed to receive the smaller projection 10. The fit of the smaller projection 10 into the circular opening 12 is a snug, sliding fit. As shown in FIG. 1, the top of the smaller projection 10 extends slightly into the interior of the pipe 2 at the center of the smaller projection 10 in a longitudinal direction of the pipe 2.

A stem 14 projects from the center of the end of said smaller projection 10 and has an enlarged head 16 at the end thereof spaced from the top of the smaller cylindrical projection 10. A holding clip 18 is formed having a channel 20 extending from one end C of the holding clip to a location past the center line A of the holding clip 18 a distance approximately equal to the diameter of the stem 14. The holding clip 18 is formed having a raised curved center section extending up to a maximum height at the center line A and also has raised ends C and B. For providing the locking action, a holding clip 18 is placed into one end of pipe 2 with its channel 20 aligned with the stem 14. The holding clip 18 is then pushed to a position where the raised curved center section engages the undersurface of the enlarged head 16 and the bottom side edges of the holding clip 18 engage the inner surface of the pipe 4 at F and G. The raised center section is formed so that as the edges F and G contact the inner surface of the pipe 2, the raised center section is applying the force necessary against the undersurface of the enlarged head 16 to rigidly hold the contoured end of pipe 4 against the outer surface of pipe 2. The height of the holding clip 18 between its top at center line A and bottom side edges which contact the inner surface of the pipe 4 at F and G, can be varied to change the force acting between the undersurface of the enlarged head 16 and the inner surface of the pipe 4. It can be seen that with the stem 14 in the end of the channel 20 on the side of the center A tapering downwardly toward the end of the channel 20 that there is no tendency for the holding clip 18 to be biased by its design from its locked position. The raised ends C and B provide for easy assembly and disassembly so they do not unduly mar or damage the interior of a pipe 2.

When the pipes are formed of PVC, ABS or any other plastic having similar characteristics of resiliency and bondability, the diametrical contour at the end of pipe 4 which fits against the side of pipe 2, is formed having a diameter which is of a slightly smaller diameter than that of the outer side of the pipe 2. For PVC pipe obtained to form the pipe connection, it was found that the diameter reduction in the diametrical contour of pipe 4 worked best in a range of approximately 0.5% to 2% of the diameter of pipe 2. For PVC pipe having an outer diameter of 1.90 inches (4.826 cm), diameter reduction in the diametrical contour of from 0.010 inches (0.0254 cm) to 0.040 inches (0.1016 cm) appeared satisfactory. In assembly, the contoured end of pipe 4 is placed with the smaller cylindrical projection 10 extending in circular opening 12 of a pipe 2 until the ends D and E meet the outer diameter of the pipe 2. This provides a space H between the contoured end of pipe 4 and pipe 2 (shown as slightly exaggerated in FIG. 4 so that the construction can be easily seen). The holding clip 18 is then placed within pipe 2 with channel 20 aligned with the stem 14; the holding clip 18 is then pressed into the position shown in FIG. 1 with the stem 14 at the end of the channel 20. This positioning of the holding clip 18 pulls the contoured end of the pipe 4 into the position shown in FIG. 2 and makes a finished smooth pipe joint as shown in FIG. 3. While pipes 2 and 4 have been shown as having the same diameter, they may have different diameters as shown in U.S. Pat. No. 1,972,997.

While FIG. 1 shows the pipe, or tubular member, 2, connected to a second pipe, or tubular member, 4, extending from the side thereof at an angle of approximately 90°, FIG. 7 shows how two pipes, or tubular members, 2 and 4, can have the locking plug 8A formed for acute angles. The cylindrical locking plug 8A is formed having its top surface at an angle to the centerline of the cylindrical locking plug which will place it substantially perpendicular to the centerline of the hole 12 of pipe 2 to which pipe 4 is being connected. In this construction, the projection 10 and enlarged head 16 project from the top surface 24 into the pipe 2 in the same manner as in FIG. 1 and the holding clip 18 holds the pipes together in the same manner.

Further, when the pipes are formed of PVC, ABS, or any other plastic having similar characteristics of resiliency and bondability, the locking plug 8, which is inserted from one end of the pipe 4, is formed of a like plastic having grooves 22 along the length thereof to permit a PVC or ABS or other plastic cement which has been coated on the interior of the pipe 4, and the exterior of the locking plug 8, to extend for the length of the locking plug when it is pushed into the one end of pipe 4. As mentioned before, these grooves permit the cement to have a liberal application for the length of the plug at a multiplicity of locations around the circumference of the locking plug.

When the locking plug 8 is formed of a plastic, it can be formed as all plastic, or be formed with plastic around a metal insert member having a stem 14 and enlarged head 16. It is necessary that the portion of the metal insert member in the plastic be contoured to interlock with the plastic to maintain a secure bond. In a modification made, a screw was used with the plastic being formed around the threaded portion of the screw. If large forces are to be encountered acting between the pipes, the locking plug 8 having a metal insert member has been found to be more reliable.

As seen in FIG. 8, the contoured end of pipe 4 is internally threaded at 30 and the cylindrical locking plug is externally threaded at 32 to be threadably engaged thereby. The top of the plug is formed in an identical manner to that of the locking plug 8 shown in FIG. 7; that is, having the stem 14 projecting from the smaller projection 10 and having enlarged head 16. A holding clip 18 is also used in the same manner. The locking plug 8B has means on each end thereof for threading the plug 8B into or out of pipe 4. Diametrically opposed holes 34 are shown on the bottom of the plug so that a tool can engage said openings to rotate the locking plug 8B and the enlarged head 16 can be formed as 4- or 6-sided so that a wrench can rotate the plug 8B. It is noted that this action permits adjusting of the distance that the enlarged head 16 is positioned into pipe 2 and this will provide for precisely setting the head 16 for a specific holding clip or for permitting the use of clips various sizes.

It is noted that the projection 10, along with the enlarged head 16, has its penetration into pipe 2 maintained less than one-half of the internal diameter of pipe 2 when diametrically opposing pipes 4 are being located at the same circumferential plane so that the integral enlarged heads 16 are properly positioned without interfering with each other. Some specific construction may call for four pipes 4 extending from a pipe 2 at the same plane normal to pipe 2. As viewed in FIG. 2, it can be seen that there is room enough to accommodate four enlarged heads 16 projecting into the pipe 2 if each enlarged head 16 and its cooperating holding clip 18 can be kept within a quadrant of the interior of the pipe 4.

I claim:

1. A pipe connection comprising a first pipe having an opening through the side thereof, a second pipe having one end contoured and fitted against the side of said first pipe and over said opening, a locking plug fixed to the interior of said second pipe adjacent the contoured end, said locking plug having a smaller projection on one end projecting into the opening in said first pipe, said smaller projection having a stem projecting from its end into the interior of said first pipe, said stem having an enlarged head on its end which is also positioned within said first pipe and spaced from the inner wall thereof, a holding clip positioned between the underside of said enlarged head and the inner surface of said first pipe holding the contoured end of said second pipe against the side of said first pipe.

2. A pipe connection as set forth in claim 1 wherein the interior of said second pipe is cylindrical and threaded, said locking plug being cylindrical and threaded, said locking plug threadably engaging the threaded interior of said second cylindrical pipe.

3. A pipe connection as set forth in claim 1 wherein said smaller projection projects into the opening of said first pipe normal to the axis of said pipe.

4. A pipe connection as set forth in claim 1 wherein said holding clip is formed having a raised center section containing the underside of the enlarged head and a lower portion to the front and to the rear thereof which contacts the inner surface of said first pipe.

5. A pipe connection as set forth in claim 4 wherein said holding clip has portions at the front and rear end thereof which are curved upwardly to provide for easy insertion and removal from its holding position between the underside of said enlarged head and the inner surface of said first pipe.

6. A pipe connection as set forth in claim 1 wherein said second pipe extends at an acute angle to the first pipe, said locking plug having a top surface which extends perpendicular to the centerline of the opening of said first pipe, said smaller projection projecting normal to said top surface of said locking plug for insertion into the opening in the side of said first pipe.

7. A pipe connection as set forth in claim 1 wherein said first pipe and said second pipe are plastic.

8. A pipe connection as set forth in claim 7 wherein said plastic is PVC.

9. A pipe connection as set forth in claim 7 wherein said plastic is ABS.

10. A pipe connection as set forth in claim 7 wherein said first pipe is cylindrical, said second pipe has one end contoured having a diameter which is slightly less than the outer diameter of said first cylindrical pipe.

11. A pipe connection as set forth in claim 10 wherein the contoured end of the second pipe has a diameter which is less than the outer diameter of said first cylindrical pipe by an amount which is in the range of approximately 0.5% to 2% of said outer diameter.

* * * * *

UNITED STATES PATENT AND TRADEMARK OFFICE
CERTIFICATE OF CORRECTION

PATENT NO. : 4,355,919
DATED : October 26, 1982
INVENTOR(S) : Kari J. Lievonen

It is certified that error appears in the above-identified patent and that said Letters Patent are hereby corrected as shown below:

Column 5, line 31, cancel "containing" and insert
-- contacting --

Signed and Sealed this

Fourth Day of January 1983

[SEAL]

Attest:

GERALD J. MOSSINGHOFF

Attesting Officer

Commissioner of Patents and Trademarks